United States Patent [19]

Jacobsen et al.

[11] Patent Number: 5,650,981

[45] Date of Patent: Jul. 22, 1997

[54] MULTI-VESSEL TIMING SYNCHRONIZATION METHOD AND DEVICE

[75] Inventors: Nils Erik Jacobsen; Anno Sauer; Ian McMillan; Rolf Ronningen, all of Houston, Tex.

[73] Assignee: Precision Seismic, Inc., Houston, Tex.

[21] Appl. No.: 1,038

[22] Filed: Jan. 6, 1993

[51] Int. Cl.$^6$ .................. G01V 1/22; G01V 1/26
[52] U.S. Cl. .................. 367/19; 367/77; 367/127; 364/421; 324/330
[58] Field of Search .................. 367/19, 20, 77, 367/106, 127; 181/110; 324/330, 331; 358/109; 364/421; 342/356; 370/104.1; 455/13.2; 968/533–922

[56] References Cited

U.S. PATENT DOCUMENTS

| | | |
|---|---|---|
| 3,733,584 | 5/1973 | Pelton, et al. . |
| 3,902,161 | 8/1975 | Kiowski et al. . |
| 3,972,019 | 7/1976 | Bassett . |
| 3,985,199 | 10/1976 | Baird . |
| 3,993,997 | 11/1976 | Jackson .................. 342/356 |
| 4,047,591 | 9/1977 | Ward et al. . |
| 4,300,653 | 11/1981 | Cao et al. . |
| 4,511,999 | 4/1985 | Bowden et al. . |
| 4,589,100 | 5/1986 | Savit . |
| 4,663,744 | 5/1987 | Russell et al. .................. 367/76 |
| 4,805,160 | 2/1989 | Ishii et al .................. 367/134 |
| 4,814,711 | 3/1989 | Olsen et al. . |
| 4,973,970 | 11/1990 | Reeser . |
| 5,133,377 | 7/1992 | Johnson . |
| 5,276,655 | 1/1994 | Rialan et al. .................. 367/77 |
| 5,416,808 | 5/1995 | Witsaman et al. .................. 455/13.2 |

FOREIGN PATENT DOCUMENTS

| | | |
|---|---|---|
| 1 515 006 | 6/1978 | United Kingdom . |
| 1 515 007 | 7/1978 | United Kingdom . |

OTHER PUBLICATIONS

PCT/NO94/00001 Written Opinion for International application No. PCT/NO94/0001, issued by the International Preliminary Examining Authority on Feb. 27, 1995.

Greene et al, Consat Tech. Rev., vol. 10, #1, 1980–Spring, pp. 179–222.

G. Lewis, "Communications Technology Handbook", 1994, TSBN 0 7506 17292; pp. 276–277.

*Primary Examiner*—Welson Moskowitz
*Attorney, Agent, or Firm*—Bardehle, Pagenberg, Dost, Altenberg, Frohwitter, Geissler and Partners

[57] ABSTRACT

This invention relates generally to a method and system for synchronizing the timing of events between and among vessels using a common timing reference.

21 Claims, 4 Drawing Sheets

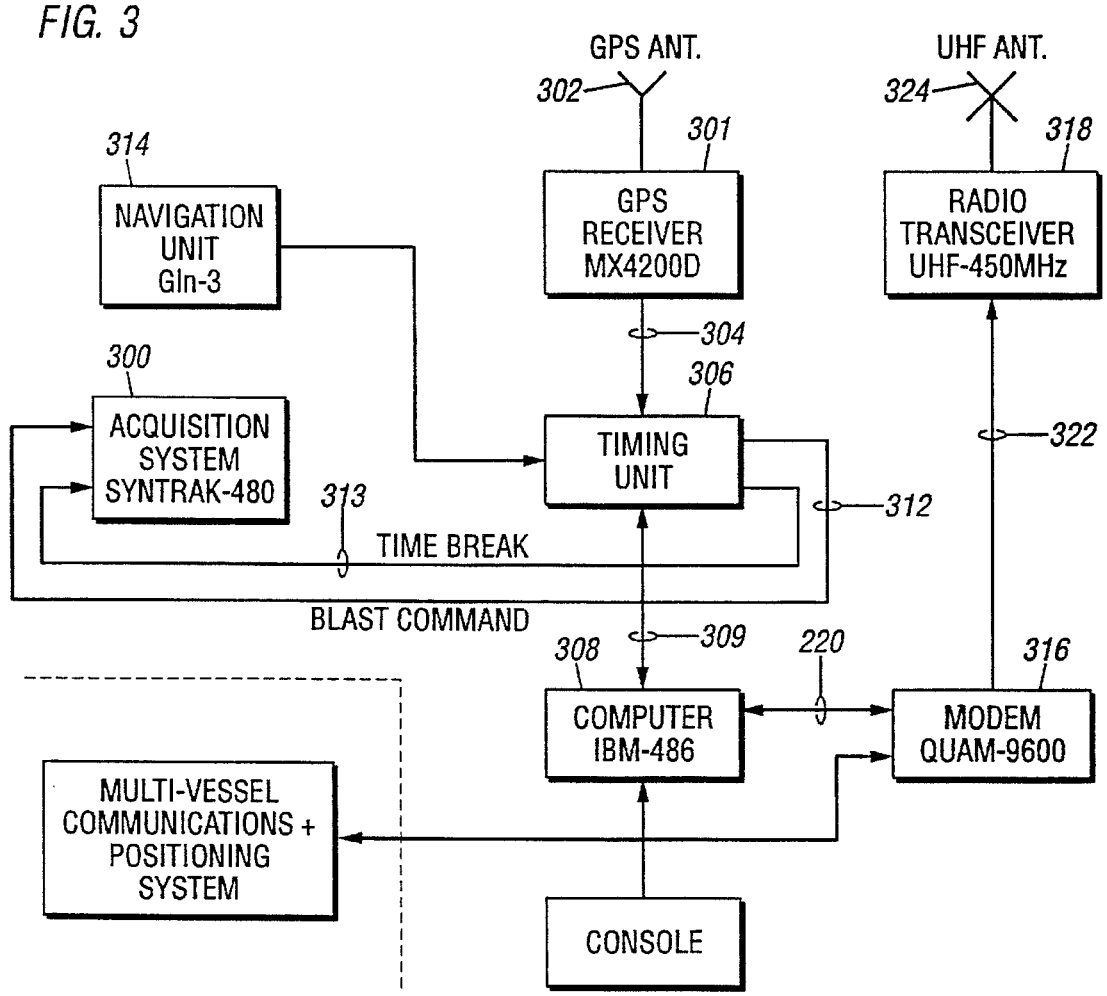

MULTI-VESSEL TIMING SYNCHRONIZATION METHOD AND DEVICE

BACKGROUND OF THE INVENTION

This invention relates to synchronization of events between multiple marine seismic vessels. A particular application of the invention relates to synchronization of sources and receivers on different vessels.

Referring now to FIG. 1, an example of a multi-vessel marine seismic formation is shown in which a master vessel 100 is moving in parallel with slave vessel 102. Both master vessel 100 and the slave vessel 102 are towing streamers 100a–100b and 102a–102b, respectively. Master vessel 100 also tows sources 100c and 100d, and the slave vessel 102 also tows sources 102c and 102d. As will be understood by those of skill in the art, streamers 100a–100b and 102a–102b include seismic signal receiving sensors (for example, hydrophones), which receive reflections of signals from sources 100c–100d and 102c–102d (for example, aqua pulse guns). As is understood by those of skill in the art, sources 100c–100d are controlled by a source controller (for example, a GCS-90 source controller) located on master vessel 100. Likewise, sources 102c and 102d are controlled by a source controller located on slave vessel 102. Signals received by streamers 100a–100b are recorded onboard master vessel 100 by a recorder (for example, a Syntrak-480 acquisition system). Likewise, signals received by streamers 102a and 102b are recorded by a recorder on slave vessel 102.

In many cases, it is desirable to record reflections of signals initiated by sources 102c and 102d at streamers 100a and 100b, and it is also desirable to record reflections from signals which are generated by sources 100c–100d and received by streamers 102a and 102b. In such situations, synchronization of the recording system on one vessel with the source on another vessel is critical to accurate data acquisition. However, while the recording systems on any given vessel are accurately synchronized with sources on the same vessel, precise coordination of recorders and sources between vessels has proved to be difficult.

An example of the problem occurs when the recording system on the master vessel is set to record seismic reflections from a source on a slave vessel. The master vessel transmits a command to the slave vessel to shoot the slave vessel's seismic source. There is a small, but significant, delay between the instant when the master vessel computer issues the command for the slave vessel source to shoot, and at the instant when the slave vessel actually causes the shot. This delay is caused by the delay inherent in the computers, radio transmission, and receiving links between the vessels.

The instant in time when any source actually fires, and the instant when any particular reflection is received by a streamer, are termed "events" which must be synchronized. Those of skill in the art will also recognize that synchronization among and between other events is also of critical importance in multi-vessel seismic exploration. Examples of such other events include: the instant in time when a particular vessel crosses a particular point on the seabed floor, the instant in time when a seismic source on a particular vessel is initiated, etc.

According to typical systems, a VHF radio link is used to communicate the events between the two vessels, with, for example, a phase locked loop circuit used to detect the events communicated on the radio link. "Blast" and "time break" commands are generated across the radio link at specific instants, based upon the calculated delay, which will, hopefully, cause the recorder to begin recording at about the same instant as the firing of the source. However, such a system requires a constantly operational radio transmission link, and the system also requires regular calibration. Calibration is normally carried out "off-line," the result of which is that timing errors may occur between calibrations that are undetected. Also, a constantly operational radio link can be broken. If broken at a time when a command to shoot the slave vessel's source is transmitted, the command will not be received, the shot will not be made, and the vessels will pass by a spot where data is required.

Such synchronization problems have been recognized in the seismic art in the past. For example, U.S. Pat. No. 4,511,999, issued to Bowden, et al. on Apr. 16, 1985, incorporated herein by reference, discloses a need for a system that provides the capability to synchronize firing of seismic sources at a precise time coinciding with times from a clock in a remote recording system. Bowden's discussion of prior art discloses devices for synchronizing seismic sources which calculate and adjust delay after receiving firing signals. Bowden's "Summary of Invention" discloses a gun shot control for seismic exploration in which a digital clock produces regularly occurring timing pulses, including shot timing pulses. An adjustable digital counter counts clock pulses in response to the occurrence of a shot timing pulse and produces a delayed shot command signal at an adjustable delay time from the shot timing signal.

The problem of synchronization between vessels is also noted in U.S. Pat. No. 4,300,653, issued to Cao, et al. on Nov. 17, 1981, incorporated herein by reference, which discloses an apparatus for controlling a precise time in firing each air gun in an array of air guns employed in marine seismic exploration. The apparatus keeps a record of past delays, and, upon receipt of a fire command, inserts appropriate delays for triggering individual air guns, based on the fire command. It will be noted that the problems discussed above with synchronization are still inherent in both Bowden and Cao; that is, both Bowden and Cao attempt to accurately calculate delay between events.

Another reference discussing synchronization of seismic sources is U.S. Pat. No. 4,047,591, issued to Ward, et al. on Sep. 13, 1977, incorporated herein by reference, which discloses an air gun construction allowing synchronization in timing of multiple air guns relative to one another. Processing circuitry associated with the air gun generates a timing signal allowing for phasing of multiple air guns, similar to the phase locked loop process discussed above.

An alternative prior art device is seen in U.S. Pat. No. 3,985,199, issued to Baird on Oct. 12, 1976 and incorporated herein by reference, which discloses an apparatus for affecting and controlling the firing of energy sources. Baird teaches the use of programmable counters for initiating the firing of different sources and a reference time counter to initiate each of the programmable counters.

U.S. Pat. No. 3,972,019, issued to Bassett on Jul. 27, 1976 and incorporated herein by reference, discloses independently operating timing units located at distant points. The units operate without transmission of timing signals between the units, because means for providing synchronization of the units are used when one unit is connected directly to the other. Bassett recognizes that coded radio systems used for controlling of remote firing systems depend upon the establishment of the same time scale at control and source locations in which fresh synchronization has to be performed for each record, resulting in overall delays which were rarely inside a designated plus or one millisecond standard. Therefore, two timing units are disclosed, one located at a remote receiving station and the other at a source station. Each unit contains an identical high stability temperature-controlled crystal oscillator, whose frequency is divided down to produce an output in intervals. Before surveying is begun (for example, at the start of each day), the two timing units are directly connected to each other for synchronization. Such a system cannot be monitored for synchronization error as the day progresses.

U.S. Pat. No. 3,902,161, issued to Kiowski, et al., on Aug. 26, 1975 and incorporated herein by reference, discloses a remote triggering device for one or more receiver stations using phase encoding of a series of binary numbers on a tone, and transmitting this series to receiving stations via radio transmission links. Synchronization is achieved by a phase locked loop, and thus has the same inherent problems discussed above.

U.S. Pat. No. 3,733,584, issued to Pelton, et al., on May 15, 1973 and incorporated herein by reference, discloses a system for remotely controlling and activating a seismic vibrator. Two clocks are used for the receiver and vibrator, which are synchronized at one time by physical connection (similar to Bassett). Pelton notes that when radio noise is high, or the distance of transmission is great, transmission of coded time signals may not be satisfactory, so Pelton provides for a system of operation in which no signal contact of any kind is required between the recording station and the vibrator. Thus, like Bassett, Pelton does not allow for exchange of information between remote units, nor does Pelton provide for re-synchronization to occur during surveying sessions.

It is apparent from the above references, that there is a need for dealing with the problems associated in delay between triggering signals and the actual occurrence of events in seismic exploration. It is also apparent from the above references that no system currently exists which allows for radio communication between master and slave vessels that is tolerant of radio noise, while still providing constant calibration and accurate synchronization between events on the master and slave vessel.

SUMMARY OF THE INVENTION

According to one aspect of the present invention, the above problems are addressed by a process for synchronizing a first event (for example, the firing of a seismic source) on a first marine vessel system and a second event (for example, the starting of a recorder) on a second marine vessel system. As used herein, "marine vessel system" includes not only the vessel itself, but any seismic streamers, towed buoys, sources, etc. that are connected by cable, rope, or wire to the vessel.

According to this aspect of the invention, the process comprises assigning a first instant in time for the occurrence of the first event and assigning a second instant in time for the occurrence of the second event. As used herein, "instant in time" refers to a specific clock time (for example, 15:00:01 hours, GMT). Further in accordance with this aspect of the invention, the process further comprises sending a time-event signal to the second marine vessel system, wherein the time-event signal includes data identifying the event and the first instant. For example, the time-event signal, according to one embodiment, comprises a binary code representing the command: "Fire source 4 at 14:06:09 GMT." The process further comprises determining the first instant from a time reference (an example of an acceptable time reference is the U.S. Department of Defense Global Positioning Satellite ["GPS"] time signal) and determining the second instant from same time reference.

According to a further embodiment of the present invention, the sending of the time-event signal is repeated until an acknowledge signal from the second marine vessel system is received, which is generated, for example, upon receipt of the time-event signal at the second marine vessel. By repeating the time-event signal (for example, over a radio-modem transmission system between vessels), and by allowing sufficient time between the instant when the time-event signal is first sent and the instant when the time-event signal designates that the event is to occur, the chances of the second vessel not receiving the time-event signal due to noise in transmission or a temporary break in the transmission link are greatly reduced. This results from the provision according to this embodiment of the repetition until receipt of an acknowledge signal.

According to yet a further embodiment, the acknowledge signal is not sent until receipt of a time-event signal meeting a pre-determined protocol. According to a further embodiment, the acknowledgement signal comprises a repeat of the time-event signal, which is compared on the first vessel to the actual time-event signal, the repetition of which is ceased if the acknowledgement signal is the same as the time-event signal.

According to still a further embodiment of the invention, there is provided a process for synchronizing a first event and a second event, wherein the events are to occur at a defined interval in time, on different marine vessels. According to this embodiment, an input event signal (for example, a navigation closure signal) is received, and a first instant in time for the occurrence of the first event is assigned. The embodiment further comprises: assigning a second instant in time for the occurrence of the second event; generating, on the first vessel and before the first instant in time, a time-tagged first event signal, wherein the time-tagged first event signal includes information identifying the first event and the first instant in time; receiving, on the second vessel and before the first instant in time, the time-tagged first event signal; and generating a command to cause the first event to occur at the absolute time designated by the time-tagged first event signal.

According to yet a further embodiment, the same absolute time reference (for example, the GPS time reference) is used for generating the time-tagged first event signal, for generating the command to cause the first event to occur, and for generating, on the first vessel, a command to cause the second event to occur during the defined interval.

According to a further embodiment of the invention, the generating of a time-tagged first event signal comprises: receiving a reference clock signal from a reference clock source; reading the time from the reference clock signal upon said receiving of an input event signal; and assigning a code representing the first event and further representing an absolute time after the time read from the reference clock signal.

According to alternative embodiments, the receiving of the reference clock signal comprises receiving a reference clock signal from an absolute time reference (for example, the GPS time reference, or any other absolute time reference which provides a signal representing a time of day, as opposed to a periodic signal representing a clock), or the reference clock signal comprises receiving a tick signal from a tick source and incrementing a counter responsive to the tick source.

According to still a further embodiment, said tick source comprises an oscillator, and said receiving of the reference clock signal further comprises: comparing the period of the tick signal to the period of a reference tick signal and adjusting the period of the tick signal to correspond to the period of the reference tick signal.

According to yet a further embodiment, reading the time from the reference clock signal comprises: reading the count of the counter upon said receiving of an input event signal and assigning a time to a particular level of the count of the counter.

BRIEF DESCRIPTION OF THE DRAWINGS

For a more complete understanding of the present invention and for further advantages thereof, references made to the following Description of the Embodiments of the Invention taken in conjunction with the accompanying drawings, in which:

FIG. 3 shows a block diagram of components of a system useful according to the present invention which is used in conjunction with the example seen in FIG. 2.

It is to be noted, however, that the appended drawings illustrate only typical embodiments of this invention and are therefore not to be considered limiting of its scope, for the invention may admit to other equally effective embodiments.

DESCRIPTION OF EMBODIMENTS OF THE INVENTION

Figure 2:
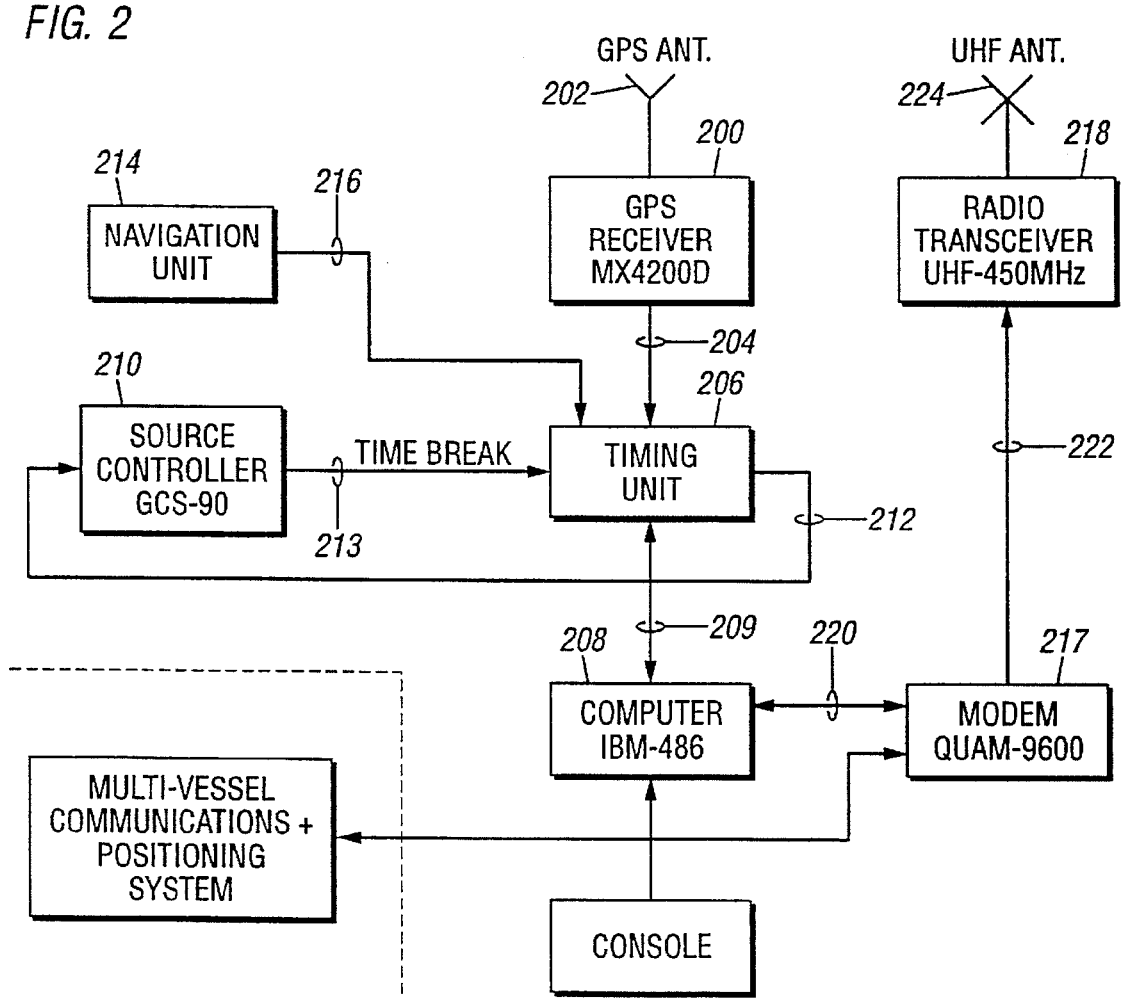
FIG. 2 shows a block diagram of an example of a system useful according to the present invention.

An example embodiment of the invention is seen in FIGS. 2 and 3. The system shown in FIG. 3 is on a vessel separate from a vessel that includes the system of FIG. 2. The purpose of the systems shown in FIGS. 2 and 3 is to synchronize the source controller 210 of FIG. 2 with a recorder 300 (FIG. 3). The example of FIG. 2 shows the interconnections between system components located on a vessel having a source which must be synchronized with a recorder on another vessel. According to the embodiment of FIG. 2, a global positioning receiver 200 (for example, a Magnovox MX4200D) receives the signal generated by the Department of Defense Global Positioning Satellite ("GPS") system via global positioning satellite antenna 202. Global positioning satellite receiver 200 generates a GPS clock signal via clock connection 204, which is received by timing unit 206, the components of which will be more fully described below. Timing unit 206 is controlled via computer 208 (a so-called "personal computer," for example, based on an Intel 486 processor). Computer 208 controls timing unit 206 via control bus 209.

Timing unit 206 is connected to source controller 210 (for example, a GCS-90) such that source controller 210 receives a blast command from timing unit 206 via blast command connection 212.

Figure 1:
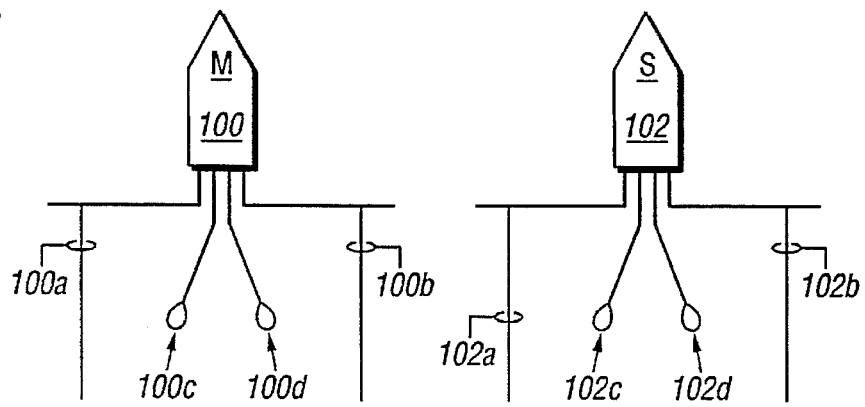
FIG. 1 shows a top view of an example of a seismic vessel formation useful with embodiments of the invention.

As is understood by those of skill in the art, there is a delay between the instant when source controller 210 receives the blast command and the instant when a source (for example, source 100c of FIG. 1), which is controlled by source controller 210, actually fires. That delay is commonly known as the "time break delay." When the source controlled by source controller 210 actually fires, source controller 210 generates a signal known as the "time break," which, according to the embodiment of FIG. 2, is provided as input to timing unit 206 via time break connection 213.

Timing unit 206 also receives a navigation signal generated by navigation unit 214 (for example, an integrated navigation system [INS], as a specific example, a GIN-3). That navigation signal is known by those of skill in the art as NavCl, or the navigation closure signal. The navigation closure signal corresponds to the arrival of a reference point on the master or slave ship at a given physical location above the sea bed floor. Timing unit 206 receives the navigation closure signal from navigation unit 214 by navigation closure connection 216.

Timing unit 206 is programmed by computer 208 to issue a blast command via blast command connection 212 to source controller 210 at an absolute time T. The time T is dependent on the NavCl and calculated from the clock signal provided by GPS receiver 200, according to the particular programming of timing unit 206, more fully described below.

Timing unit 206 also generates a time-tagged navigation closure signal (TTNC) code representing the absolute instant in time T when the blast command will be issued by timing unit 206. Computer 208 causes the time-tagged navigation closure signal code to be transmitted via modem 217 (for example, a QUAM-9600), radio transceiver 218 (for example, a UHF-transceiver), and UHF antenna 224 to another vessel. That other vessel includes a recorder which is to record signals generated by the sources initiated by source controller 210 at the designated time as specified in the message from the source vessel.

Modem 217 is connected to computer 208 via any modem connection 220 that would occur to those of skill in the art. Modem 217 is connected to radio transceiver 218 via any modem-radio transceiver connection 222 that would occur to those of skill in the art.

It will be noted that the system of FIG. 3 is almost identical to the system seen in FIG. 2. For example, the system of FIG. 3 includes a global positioning satellite receiver 301 which, through a GPS antenna 302, generates a GPS clock signal 304 for timing unit 306. Timing unit 306 is controlled via control bus 309 by computer 308. Computer 308 is in communication with computer 208 via UHF antenna 324, radio transceiver 318, cable 322, modem 316, and cable 220. Timing unit 306 is also connected to a navigation unit 314.

According to the example, GPS receiver 301 is identical to GPS receiver 200, computer 308 is identical to computer 208, modem 316 is identical to modem 217, radio transceiver 318 is identical to radio transceiver 218, and navigation unit 314 is identical to navigation unit 214. Programming of the various elements differs in some respects as will be understood by those of skill in the art, based on the following description.

As described above, the time-tagged navigation closure signal (TTNC) is transmitted in a digital code form, via radio transmitter 218 (FIG. 2), and is received by computer 308 (FIG. 3) via UHF antenna 324, radio transceiver 318, cable 322, modem 316, and cable 220. According to one embodiment of the invention, upon receipt of the TTNC, computer 308 causes an acknowledgement signal to be transmitted via UHF antenna 324. According to a further embodiment, computer 208 continues to transmit the TTNC until receipt of the acknowledgement signal from computer 308.

Timing unit 306 is programmed to generate a blast command and a time break command via blast command connector 312 and time break signal connector 313 in a pattern understood by those of skill in the art required to initialize and begin recording of recorder 300 (for example, a Syntrak-480 acquisition system). According to the programming of one embodiment, timing unit 306 generates the blast and time break commands after receipt of the TTNC.

Timing unit 306 uses the GPS clock signal 304 as its absolute time reference; meanwhile, timing unit 206 (FIG. 2) also uses GPS clock signal 204 as its absolute time reference. Therefore, while timing unit 306 is causing recorder 300 to be initialized and begin recording, timing unit 206 (FIG. 2) is issuing a blast command, timed such that source controller 210 will cause the designated source to fire at the same absolute time as recorder 300 (FIG. 3) begins recording. Thus, a source on one vessel is synchronized with a recorder on another vessel.

According to an alternative embodiment, navigation unit 314, not navigation unit 214, is used for spacial reference. According to this embodiment, timing unit 306 uses a navigation closure signal from navigation unit 314 to generate a time-tagged navigation closure signal which represents a future absolute time for the firing of a source controlled by source controller 210 (FIG. 2) located on a vessel separate from the vessel which includes navigation unit 314 and timing unit 306. According to such an embodiment, computer 308 repetitively transmits a code representing the time-tagged navigation closure signal via modem 316, radio transceiver 318, and UHF antenna 324; and, upon receipt of the time-tagged navigation closure signal code sent by computer 308, computer 208 transmits an acknowledgement signal via modem 217, radio transceiver 218, and UHF antenna 224. Timing unit 206 then causes a blast command to occur at the designated instant when the designated source is to be fired by source controller 210. Meanwhile, timing unit 306 (FIG. 3) causes recorder 300 to begin recording at the same designated instant.

It will be understood by those of skill in the art that, with multiple inputs and multiple outputs to timing units 206 and 306, multiple sources and recorders on multiple vessels are synchronized, according to further embodiments of the invention.

A significant benefit of the above-described examples over the prior art is the ability to repetitively transmit the time-tagged navigation closure signal while waiting for an acknowledge signal from another vessel. This results in a high tolerance for noisy radio transmission links. For example, if noise, an obstruction, or some other problem occurs to break the radio link during the transmission of the time-tagged navigation closure signal, and the radio link is reestablished before the instant when source controller 210 is to cause a designated source to fire, the retransmission of the TTNC allows the receiving computer to prepare the respective source or recorder in time to make the shot.

Referring again to FIGS. 2 and 3, timing units 206 and 306 are, according to one embodiment, identical in hardware. An example embodiment of timing unit 206 or timing unit 306 is seen in FIGS. 4a and 4b in block diagram form as timing unit 400.

Figure 4A:
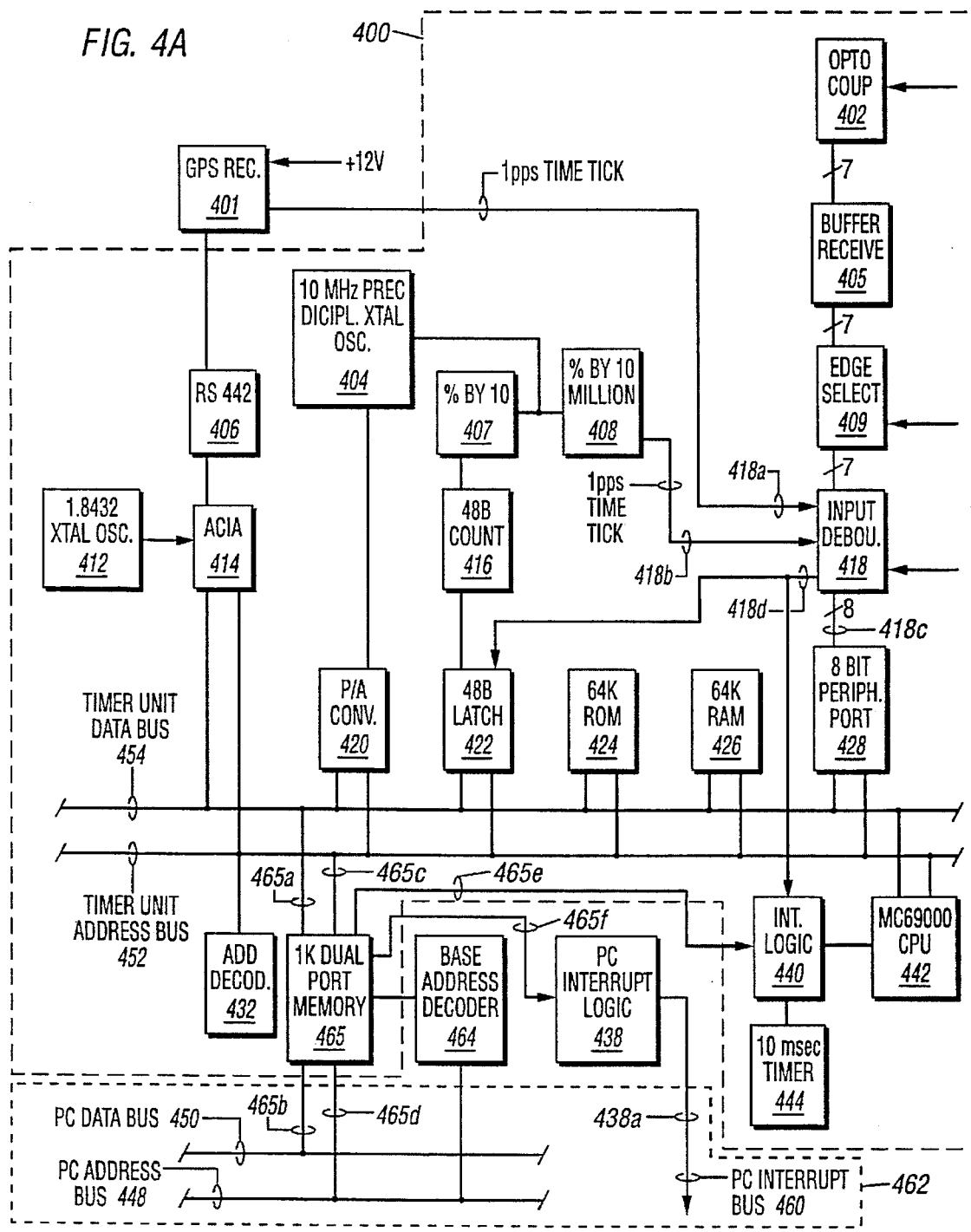
FIGS. 4a and 4b show a block diagram of components of an embodiment of the timing unit shown in FIGS. 2 and 3.
Figure 4B:
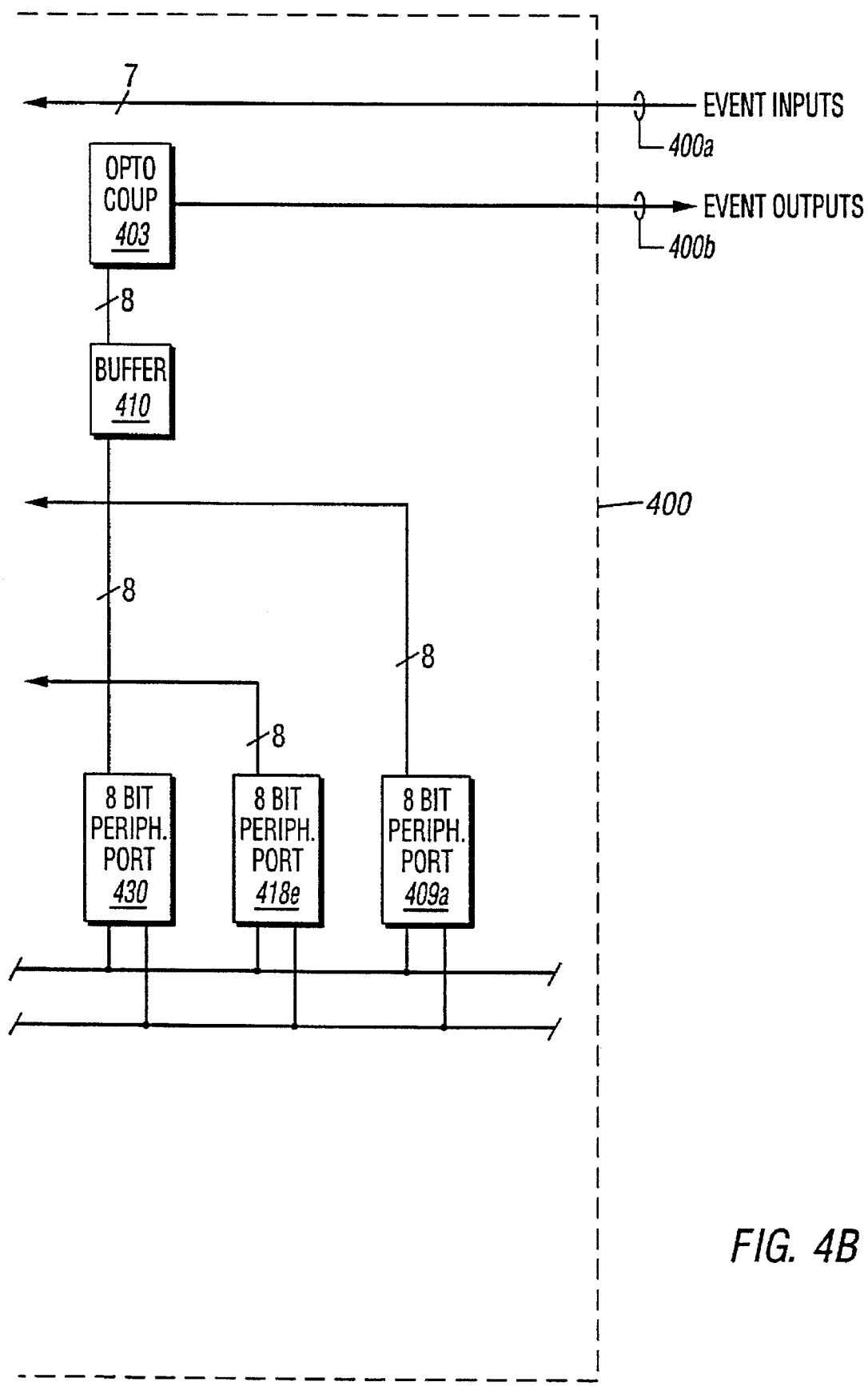

According to the embodiment of FIGS. 4a and 4b, timing unit 400 includes seven event inputs 400a which are each connected via opto coupler 402 to buffer 405, which is, in turn, connected to edge select circuit 409. Edge select circuit 409 comprises, for example, seven exclusive-or 7486 circuits, one for each input. Selection of the leading or trailing edge of an input is made via 8 bit peripheral port 409a under control of a microprocessor 442 (for example, an MC68HC000, run at 16 MHz), which is connected to 8 bit peripheral port 409a via timer unit data bus 454 and timer unit address bus 452. The outputs of edge select circuit 409 are provided to seven of nine inputs of input debounce circuit 418. The eighth input of input debounce circuit 418 is connected to a GPS time tick input 418a. The ninth input to input debounce circuit 418 is connected to oscillator time tick input 418b. All nine of the inputs to input debounce circuit 418 comprise D-flip-flops. Input debounce circuit 418 further includes eight outputs 418c, representing the debounced values of inputs 400a and which are connected to 8 bit peripheral port 428. 8 bit peripheral port 428 is connected to timer unit data bus 454 and timer unit address bus 452, which allows CPU 442 to control peripheral port 428 as is understood by those of skill in the art.

According to one embodiment, CPU 442 calculates absolute times for events (for example, blast commands) using information provided via 48 bit latch 422, which is connected to timer unit data bus 454 and timer unit address 452. Such connections are understood by those of skill in the art.

According to one embodiment of the invention, CPU 442 is provided with an absolute time corresponding to count zero of 48 bit counter 416 (which is latched for reading by 48 bit latch 422 as is understood by those of skill in the art). Thus, as 48 bit counter 416 increments, CPU 442 can calculate the time knowing the time interval of each count of 48 bit counter 416. According to the embodiment shown, the time interval for each count of 48 bit counter 416 is 1 microsecond, a value which is provided to CPU 442 via software. The absolute time for zero count of 48 bit counter 416 is provided to CPU 442 via a signal from GPS receiver 401 via RS 442 communications port 406 and an asynchronous communications interface adaptor 414, which uses a 1.8432 Xtal oscillator 412 to provide the communications baud rate. The signal received via GPS receiver 401 includes time and date information which CPU 442 is programmed to extract, as is understood by those of skill in the art.

48 bit counter 416 is incremented by a 10 MHz precision disciplined Xtal oscillator 404, the output of which is provided to 48 bit counter 416 via a divide-by-ten circuit 407. Upon reception of an input event at input debounce circuit 418, a latch signal is provided via latch output 418d of input debounce circuit 418, to 48 bit latch 422. Upon receipt of the latch signal, 48 bit latch 422 latches the count of 48 bit counter 416. Latch 418d is also provided to interrupt logic 440, which generates an interrupt to CPU 442, which, in turn, causes CPU 442 to read from 48 bit latch 422. After reading 48 bit latch 422, CPU 442 next reads from 8 bit peripheral port 428 the data from outputs 418c of input debounce circuit 418. Seven of outputs 418c comprise input signals (one or more of which may have changed state), and the eighth output of input debounce circuit 418 comprises the GPS receiver output of one pulse per second.

Each time a later signal is generated at output 418d, interrupt logic 440 causes CPU 442 to read the value of 48 bit latch 422 and subtract that value from the previous value. Because the latch signal 418d occurs only in response to the one second GPS signal at input 418a, the result of the subtraction should equal one second. Any deviation from that one second result is presumed to be the result of oscillator drift.

CPU 442 averages the change in time difference between the GPS clock and the clock signal provided by 10 MHz oscillator 404, one each hour. At the end of one hour, CPU 442, via digital to analog converter 420, tunes 10 MHz oscillator 440. Therefore, oscillator 440 is referenced to the GPS clock once each hour, thus providing a highly accurate increment for 48 bit counter 416.

It should be noted that GPS reception is not consistent. For example, the Department of Defense periodically shuts down the time signal. By using oscillator 404, timing unit 400 is able to continue operation even if there is no GPS clock for an extended period of time, up to a few days, without detrimental loss of accuracy.

After making whatever calculations are necessary, based on the individual input event that caused a latch signal to be issued via latch output 418*d* of input debounce 418, CPU 442 reenables the individual flip-flop for that input within input debounce circuit 418 via reenable 8 bit peripheral port 418*e*.

Event outputs determined by CPU 442 to be required are generated in intervals of 10 milliseconds via 8 bit peripheral output port 430, buffer 410, and opto coupler 403, which, in turn is connected to eight event output connections 400*b*. CPU 442 generates the output events based on interrupt signals generated from 10 millisecond timer 444 and interrupt logic 440. Every 10 milliseconds the 48 bit counter is compared with a programmed value, which represents an absolute time at which time an output event should be generated. When the 48 bit counter value has just exceeded the programmed value, the output event is generated by CPU 442.

Timing unit 400 is programmed and controlled via 1K dual port memory 465. Dual port memory 465 includes data connection 465*a*, which is connected to timing unit data bus 454; data connection 465*b*, which is connected to data bus 450 of an external computer 462 (for example, computer 208 or computer 308 of FIGS. 2 and 3); address connection 465*c*, which is connected to timer unit address bus 452; and address connection 465*d*, which is connected to external computer address bus 448. Via external computer data and address buses 450 and 448, external computer 462 interacts with CPU 442. CPU 442 is initialized via a boot-up program contained in 64K ROM 424 and runs operating programs loaded into 64K RAM 426 by external computer 462 via dual port memory 465 as is understood by those of skill in the art. CPU 442 also uses 64K RAM 426 as temporary storage for interim calculations (as is also understood by those of skill in the art) and provides data to external computer 462 via dual port memory 465.

Changes to the programming and parameter values used by CPU 442 are provided through dual port memory 465. When external computer 462 writes to a memory location of dual port memory 465, an interrupt is generated via interrupt connection 465*e* to interrupt logic 440. That interrupt causes CPU 442 to read the new commands and/or parameter values from dual port memory 465 as is understood by those of skill in the art. Likewise, if CPU 442 writes data to dual port memory 465 for external computer 462, an interrupt is provided via interrupt connection 465*f* to external computer interrupt logic circuit 438, which generates an interrupt signal via interrupt signal connection 438*a*. External computer 462 and CPU 442 are prevented from simultaneously writing and reading from the same location of dual port memory 465 through use of a handshake bit, as is understood by those of skill in the art.

A base address decoder 464 is also provided to allow external computer 462 access to dual ported memory 465, which, according to the embodiment of FIGS. 4*a* and 4*b*, is located at memory address C800:000 of a '486-based system.

As will be understood by those of skill in the art, an address decoder 432 is provided within timing unit 400 for control of memory mapped components (for example, RAM 264, ROM 424), asynchronous communications interface adaptor 414, digital to analog converter 420, and peripheral ports 428, 430, 418*e*, and 409*a*.

Chip selects signals and reset signals for the various components are provided, according to alternative embodiments, in any number of ways as will occur to those of skill in the art, depending upon the particular input events and output events to be processed. Likewise, programming executed by CPU 442 and external computer 462 will vary, depending upon input events and output events to be processed, and is within the skill of those in the art.

The above description is given by way of example only, and further embodiments will occur to those of skill in the art without parting from the spirit of the invention described by the claims below.

What is claimed is:

1. A process for synchronizing a first event on a first marine seismic vessel system and a second event on a second marine seismic vessel system, comprising:

assigning a first instant in time for the occurrence of the first event;

assigning a second instant in time for the occurrence of the second event;

sending a time-event signal from the first marine vessel system to the second marine vessel system, wherein the time-event signal includes data identifying the event and the first instant;

providing an acknowledge signal from the second marine vessel system upon receipt of the time-event signal;

repeating said sending until receipt of the acknowledge signal at the first marine vessel;

determining on the first marine vessel system the first instant from a time reference to cause the first event to occur on the first marine vessel system at the first instant; and determining on the second marine vessel system the second instant from the time reference to cause the second event to occur on the second marine vessel system at the second instant, wherein the time reference used for said determining the first instant is the same time reference used for said determining the second instant.

2. A process for synchronizing a first event on a first marine seismic vessel and a second event on a second marine seismic vessel, wherein the events are to occur at a defined interval in time, comprising:

receiving on the first vessel an event input signal;

receiving on the first vessel a reference clock signal from a reference clock source;

reading the time from the reference clock signal upon said receiving an input event signal;

determining an absolute time at which the first event should occur based on the event input signal and the reference clock signal;

sending, on the first vessel and before the absolute time, a time-tagged first event signal, wherein the time-tagged first event signal includes information identifying the first event and the absolute time;

receiving, on the second vessel and before the absolute time, the time-tagged first event signal; and generating a command to cause the first event to occur at the absolute time designated by the time-tagged first event signal.

3. A process as in claim 2 further comprising using the same reference clock signal for said generating the time-tagged first event signal and for said generating the command to cause the first event to occur.

4. A process as in claim 2 further comprising generating, on the first vessel, a command to cause the second event to occur before the absolute time.

5. A process as in claim 4 further comprising using the same absolute time reference for said generating the command to cause the second event to occur before the absolute time and for generating the command to cause the first event to occur at the absolute time designated by the time-tagged first event signal.

6. A process as in claim 2 wherein said receiving an event input signal comprises receiving a navigational closure signal.

7. A process as in claim 2 wherein said receiving of the reference clock signal comprises receiving a reference clock signal from a clock.

8. A process as in claim 2 wherein said receiving of the reference clock signal comprises:

receiving a tick signal from a tick source; and incrementing a counter responsive to the tick source.

9. A process as in claim 2 wherein said reading the time from the reference clock signal comprises:

reading the count of the counter upon said receiving of an input event signal; and assigning a time to a particular level of the count of the counter.

10. A process as in claim 8 wherein said tick source comprises an oscillator, and wherein said receiving of the reference clock signal further comprises:

comparing the period of the tick signal to the period of a reference tick signal; and adjusting the period of the tick signal to correspond to the period of the reference tick signal.

11. A process as in claim 10 wherein said reading the time from the reference clock signal comprises:

reading the count of the counter upon said receiving of an input event signal; and assigning a time to a particular level of the count of the counter.

12. A system for synchronizing a first event on a first marine seismic vessel system and a second event on a second marine seismic vessel system, comprising:

means for assigning a first instant in time for the occurrence of the first event;

means for assigning a second instant in time for the occurrence of the second event;

means for sending a time-event signal to the second marine vessel system, wherein the time-event signal includes data identifying the event and the first instant;

means for providing an acknowledge signal from the second marine vessel system upon receipt of the time-event signal;

means for repeating said sending until receipt of the acknowledge signal at the first marine vessel, means for determining the first instant from a time reference to cause the first event to occur at the first instant; and means for determining the second instant from the time reference to cause the second event to occur at the second instant, wherein the time reference used for said determining the first instant is the same time reference used for determining the second instant.

13. A system for synchronizing a first event on a first marine seismic vessel and a second event on a second marine seismic vessel, wherein the events are to occur at a defined interval in time, comprising:

means for receiving on the first vessel an event input signal;

means for receiving on the first vessel a reference clock signal from a reference clock source;

means for reading the time from the reference clock signal upon said receiving of an input event signal;

means for determining an absolute time at which the first event should occur based on the event input signal and the reference clock signal;

means for sending, on the first vessel and before the absolute time, a time-tagged first event signal,
wherein the time-tagged first event signal includes information identifying the first event and the absolute time;

means for receiving, on the second vessel and before the absolute time, the time-tagged first event signal; and means for generating a command to cause the first event to occur at the absolute time designated by the time-tagged first event signal.

14. A system as in claim 13 further comprising means for using said reference clock signal for said generating the time-tagged first event signal and for said generating the command to cause the first event to occur.

15. A system as in claim 13 further comprising means for generating, on the first vessel, a command to cause the second event to occur before the absolute time.

16. A system as in claim 15 further comprising means for using said reference clock signal for said generating the command to cause the second event to occur before the absolute time and for generating the command to cause the first event to occur at the absolute time designated by the time-tagged first event signal.

17. A system as in claim 13 wherein said means for receiving of the reference clock signal comprises means for receiving a reference clock signal from a clock.

18. A system as in claim 13 wherein said means for receiving of the reference clock signal comprises:

means for receiving a tick signal from a tick source; and means for incrementing a counter responsive to the tick source.

19. A system as in claim 18 wherein said means for reading the time from the reference clock signal comprises:

means for reading the count of the counter upon said receiving of an input event signal; and means for assigning a time to a particular level of the count of the counter.

20. A system as in claim 18 wherein said tick source comprises an oscillator, and wherein said means for receiving of the reference clock signal further comprises:

means for comparing the period of the tick signal to the period of a reference tick signal; and means for adjusting the period of the tick signal to correspond to the period of the reference tick signal.

21. A system as in claim 20 wherein said means for reading the time from the reference clock signal comprises:

means for reading the count of the counter upon said receiving of an input event signal; and means for assigning a time to a particular level of the count of the counter.

* * * * *